United States Patent
Benyamin et al.

(10) Patent No.: US 8,554,854 B2
(45) Date of Patent: *Oct. 8, 2013

(54) SYSTEMS AND METHODS FOR IDENTIFYING TERMS RELEVANT TO WEB PAGES USING SOCIAL NETWORK MESSAGES

(75) Inventors: Daniel Benyamin, Beverly Hills, CA (US); Aaron Chu, Los Angeles, CA (US); Michael Hall, Valencia, CA (US)

(73) Assignee: CitizenNet Inc., Los Angeles, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 12/966,921

(22) Filed: Dec. 13, 2010

(65) Prior Publication Data

US 2011/0145348 A1    Jun. 16, 2011

Related U.S. Application Data

(60) Provisional application No. 61/285,944, filed on Dec. 11, 2009.

(51) Int. Cl.
    *G06F 15/16*    (2006.01)
(52) U.S. Cl.
    USPC ........... 709/206; 709/207; 707/731; 707/748; 707/771
(58) Field of Classification Search
    None
    See application file for complete search history.

(56) References Cited

U.S. PATENT DOCUMENTS

| | | | |
|---|---|---|---|
| 5,465,309 A | 11/1995 | Johnson | |
| 5,835,087 A | 11/1998 | Herz et al. | |
| 5,999,902 A | 12/1999 | Scahill et al. | |
| 6,515,681 B1 | 2/2003 | Knight | |
| 6,571,225 B1 | 5/2003 | Oles et al. | |
| 6,571,234 B1 | 5/2003 | Knight et al. | |
| 6,766,349 B1* | 7/2004 | Belkin | 718/104 |
| 7,080,139 B1 | 7/2006 | Briggs et al. | |
| 7,089,226 B1 | 8/2006 | Dumais et al. | |
| 7,421,395 B1* | 9/2008 | Link et al. | 705/319 |
| 7,603,349 B1 | 10/2009 | Kraft et al. | |
| 7,657,515 B1* | 2/2010 | Jewell | 707/999.003 |
| 7,734,627 B1* | 6/2010 | Tong | 707/737 |
| 7,743,051 B1 | 6/2010 | Kashyap et al. | |
| 7,860,928 B1 | 12/2010 | Anderson | |
| 7,917,528 B1 | 3/2011 | Dave et al. | |
| 7,925,496 B1* | 4/2011 | Rubin | 704/7 |

(Continued)

OTHER PUBLICATIONS

Acar et al., "Modeling and Multiway Analysis of Chatroom Tensors", ISI'05 Proceedings of the 2005 IEEE international conference on Intelligence and Security Informatics, 13.

(Continued)

*Primary Examiner* — Backhean Tiv
(74) *Attorney, Agent, or Firm* — KPPB LLP (57) ABSTRACT

Systems and methods for retrieving social network messages and/or web pages in response to search queries are described. One embodiment of the invention includes generating a word list from at least a portion of the content of the web page using a web and message server system, generating an initial list of relevant terms based upon the word list using the web and message server system, identifying additional relevant terms using messages posted to at least one social network based upon the initial list of relevant terms, and creating an updated list of relevant terms by using the web and server system to combine terms in the initial list of relevant terms with the additional relevant terms identified using messages posted to at least one social network.

26 Claims, 4 Drawing Sheets

(56) References Cited

U.S. PATENT DOCUMENTS

| | | | |
|---|---|---|---|
| 7,933,818 | B1 | 4/2011 | Kumar et al. |
| 7,941,437 | B2 | 5/2011 | Cooley |
| 8,086,631 | B2 | 12/2011 | Gollapudi et al. |
| 8,301,616 | B2 | 10/2012 | Guha et al. |
| 8,380,697 | B2 | 2/2013 | Benyamin et al. |
| 8,504,550 | B2 | 8/2013 | Hall et al. |
| 2002/0016787 | A1 | 2/2002 | Kanno |
| 2002/0062368 | A1 | 5/2002 | Holtzman et al. |
| 2002/0123928 | A1 | 9/2002 | Eldering et al. |
| 2003/0028595 | A1 | 2/2003 | Vogt et al. |
| 2003/0164855 | A1* | 9/2003 | Grant et al. ............ 345/763 |
| 2005/0080613 | A1 | 4/2005 | Colledge et al. |
| 2005/0080856 | A1 | 4/2005 | Kirsch |
| 2005/0204002 | A1 | 9/2005 | Friend |
| 2006/0069589 | A1 | 3/2006 | Nigam et al. |
| 2006/0242128 | A1* | 10/2006 | Goel .......................... 707/3 |
| 2006/0253437 | A1* | 11/2006 | Fain et al. ................. 707/5 |
| 2006/0282328 | A1 | 12/2006 | Gerace et al. |
| 2007/0033104 | A1 | 2/2007 | Collins et al. |
| 2007/0061195 | A1 | 3/2007 | Liu et al. |
| 2007/0106500 | A1 | 5/2007 | Loofbourrow et al. |
| 2007/0124432 | A1 | 5/2007 | Holtzman et al. |
| 2007/0260580 | A1 | 11/2007 | Omoigui |
| 2007/0288433 | A1 | 12/2007 | Gupta et al. |
| 2008/0021884 | A1 | 1/2008 | Jones et al. |
| 2008/0059488 | A1* | 3/2008 | Iyengar et al. ........... 707/100 |
| 2008/0091670 | A1 | 4/2008 | Ismalon |
| 2008/0140502 | A1 | 6/2008 | Birnholz et al. |
| 2008/0172368 | A1 | 7/2008 | Chowdhury et al. |
| 2008/0222142 | A1* | 9/2008 | O'Donnell ................. 707/5 |
| 2008/0243842 | A1 | 10/2008 | Liang et al. |
| 2008/0294624 | A1 | 11/2008 | Kanigsberg et al. |
| 2008/0313215 | A1* | 12/2008 | Beker et al. ............... 707/102 |
| 2009/0049029 | A1* | 2/2009 | Choi et al. ................. 707/5 |
| 2009/0049127 | A1 | 2/2009 | Juan et al. |
| 2009/0063469 | A1 | 3/2009 | Gross |
| 2009/0070219 | A1 | 3/2009 | D'angelo et al. |
| 2009/0070346 | A1 | 3/2009 | Savona et al. |
| 2009/0100042 | A1* | 4/2009 | Qiao .......................... 707/5 |
| 2009/0109872 | A1* | 4/2009 | Skubacz et al. .......... 370/254 |
| 2009/0119167 | A1* | 5/2009 | Kendall et al. ............ 705/14 |
| 2009/0119261 | A1 | 5/2009 | Ismalon |
| 2009/0164464 | A1* | 6/2009 | Carrico et al. ............ 707/5 |
| 2009/0171686 | A1 | 7/2009 | Eberstadt |
| 2009/0177754 | A1 | 7/2009 | Brezina et al. |
| 2009/0216696 | A1* | 8/2009 | Downs et al. ............. 706/20 |
| 2009/0276285 | A1 | 11/2009 | Nomula |
| 2010/0049534 | A1 | 2/2010 | Whitnah et al. |
| 2010/0169327 | A1 | 7/2010 | Lindsay et al. |
| 2010/0223279 | A1* | 9/2010 | Scott .......................... 707/769 |
| 2010/0268628 | A1* | 10/2010 | Pitkow et al. ............. 705/34 |
| 2010/0293170 | A1 | 11/2010 | Hall et al. |
| 2010/0306249 | A1 | 12/2010 | Hill et al. |
| 2011/0060794 | A1* | 3/2011 | Sweeney .................. 709/204 |
| 2011/0078130 | A1 | 3/2011 | Roizen et al. |
| 2011/0093455 | A1 | 4/2011 | Benyamin et al. |
| 2011/0145348 | A1 | 6/2011 | Benyamin et al. |
| 2011/0231240 | A1 | 9/2011 | Schoen et al. |
| 2012/0004959 | A1 | 1/2012 | Benyamin et al. |
| 2012/0158489 | A1 | 6/2012 | Benyamin et al. |
| 2012/0158518 | A1 | 6/2012 | Benyamin et al. |
| 2012/0259619 | A1 | 10/2012 | Hall |
| 2012/0323674 | A1 | 12/2012 | Simmons et al. |
| 2012/0323905 | A1* | 12/2012 | Qiao .......................... 707/723 |
| 2013/0036107 | A1 | 2/2013 | Benyamin et al. |
| 2013/0179426 | A1 | 7/2013 | Benyamin et al. |

OTHER PUBLICATIONS

Gamon, "Sentiment classification on customer feedback data: noisy data, large feature vectors, and the role of linguistic analysis", Proceedings of the 20th international conference on Computational Linguistics, Association for Computational Linguistics, 2004, 7 pgs.

Garg et al., "Understanding Probabilistic Classifiers", Machine Learning: ECML 2001, 2001, 179-191.

Hein, "How Search Really Works: The Keyword Density Myth", Search Engine People, found on line at www.searchenginepeople.com/blog/how-search-really-works-the-keyword-density-myth.html, Feb. 1, 2008.

Liu et al., "Personalized Web Search for Improving Retrieval Effectiveness", IEEE Transactions on Knowledge and Data Engineering, vol. 16, No. 1, Jan. 2004.

Pearlman, "Facebook Ads", The Facebook Blog, found on line at blog.facebook.com/blog.php?post=6972252130, Nov. 6, 2007, 2 pgs.

Press et al., "Numerical Recipes in FORTRAN 77", vol. 1 of Fortran Numerical Recipes: The Art of Scientific Computing, Cambridge University Press, 1992, pp. 490-494.

"Automatic Expansion of Domain-Specific Lexicons by Term Categorization", ACM Transactions on Speech and Language Processing, vol. 3, No. 1, May 2006, pp. 1-30.

Ambekar et al., "Name-Ethnicity Classification from Open Sources", KDD '09, Jun. 28-Jul. 1, 2009, 9 pgs.

Androutsopoulos et al., "An Evaluation of Naive Bayesian Anti-Spam Filtering", Proceedings of the workshop on machine Learning in the New Information Age, 2000, pp. 9-17.

Argamon et al., "Gender, Genre and Writing Style in Formal Written Texts", Source and date unknown, 32 pgs.

Backstrom et al., "Find Me if You Can: Improving Geographical Prediction with Social and Spatial Proximity", WWW, 2010, 10 pgs.

Backstrom et al., "Network Bucket Testing", Source and date unknown, 10 pgs.

Bakshy et al., "Everyone's an Influencer: Quantifying Influence on Twitter", WSDM '11, Feb. 9-12, 2011, 10 pgs.

Bakshy et al., "The Role of Social Networks in Information Diffusion", Source and date unknown, 9 pgs.

Bernstein et al., "Eddi: Interactive Topic-based Browsing of Social Status Streams", UIST, 2010, 10 pgs.

Berwick, "An Idiot's Guide to Support Vector Machines (SVMs)", Source and date unknown, 25 pgs.

Blei et al., "Latent Dirichlet Allocation", Source and date unknown, 8 pgs.

Bollen et al., "Modeling public mood and emotion: Twitter sentiment and socio-economic phenomena", WWW, Apr. 2010, 10 pgs.

Burke et al., "Feed Me: Motivating Newcomer Contribution in Social Network Sites", CHI 2009, Apr. 4-9, 2009, 10 pgs.

Burke et al., "Social Capital on Facebook: Differentiating Uses and Users", CHI, 2011, 10 pgs.

Burke et al., "Social Network Activity and Social Well-Being", CHI 2010, 4 pgs.

Cer et al., "Parsing to Stanford Dependencies: Trade-offs between speed and accuracy", Source and date unknown, 5 pgs.

Chang, "Not-So-Latent Dirichlet Allocation: Collapsed Gibbs Sampling Using Human Judgments", Proceedings of the NAACL HLT 2010 Workshop on Creating Speech and Language Data with Amazon's Mechanical Turk, pp. 131-138.

Chang et al., "ePluribus: Ethnicity on Social Networks", Association for the Advancement of Artificial Intelligence, 2010, 8 pgs.

Ghosh et al., "Community Detection Using a Measure of Global Influence", 2nd SNA-KDD Workshop, 2008, 9 pgs.

Ghosh et al., "Structure of Heterogeneous Networks", Source unknown, Jun. 11, 2009, 8 pgs.

Go et al., "Twitter Sentiment Analysis", CS224N—Final Project Report, Jund 6, 2009, 17 pgs.

Go et al., "Twitter Sentiment Classification Using Distant Supervision", Source and date unknown, 6 pgs.

Hearst, "Trends & Controversies—Support Vector Machines", IEEE Intelligent Systems, Jul./Aug. 1998, pp. 18-28.

Joachims, "Text Categorization with Support Vector Machines: Learning with Many Relevant Features", Universitat Dortmund Fachbereich Informatik, Nov. 1997, 18 pgs.

Kim et al., "Literary Style Classification with Deep Linguistic Analysis Features", Source and date unknown, 7 pgs.

Kintsch, "Predication", Source and date unknown, 40 pgs.

Kintsch, "The Role of Knowledge in Discourse Comprehension: A Construction-Integration Model", Psychological Review, 1988, vol. 95, No. 2, pp. 163-182.

(56) References Cited

OTHER PUBLICATIONS

Kramer, "An Unobtrusive Behavioral Model of "Gross National Happiness"", CHI 2010: Language 2.0, Apr. 10-15, 2010, pp. 287-290.
Lerman, "Semantic Labeling of Online Information Sources", Source and date unknown, 19 pgs.
Li et al., "Keyword Extraction for Social Snippets", WWW 2010, Apr. 26-30, 2010, 2 pgs.
Lu et al., "Opinion Integration Through Semi-supervised Topic Modeling", WWW 2008, Refereed Track: Data Mining—Modeling, Apr. 21-25, 2008, pp. 121-130.
Meyer, "Support Vector Machines", Source unknown; Sep. 12, 2011, pp. 1-8.
Mishne, "Experiments with Mood Classification in Blog Posts", Style 2005, 8 pgs.
Pang et al., "Opinion Mining and Sentiment Analysis", Foundations and Trends in Information Retrieval, 2008, vol. 2, Nos. 1-2, pp. 1-135.
Ratkiewicz et al., "Detecting and Tracking the Spread of Astroturf Memes in Microblog Streams", Source unknown, Nov. 2010, 10 pgs.
Scott et al., "Text Classification Using WordNet Hypernyms", Source and date unknown, pp. 45-51.
Sun et al., "Gesundheit! Modeling Contagion through Facebook News Feed", Association for the Advancement of Artificial Intelligence, 2009, 8 pgs.
Tyler et al., "Retrieval Models for Audience Selection in Display Advertising", CIKM 2011, 6 pgs.
Wallach, "Topic Modeling: Beyond Bag-of-Words", Source unknown, Jun. 26, 2006, 40 pgs.
Wilson et al., "Term Weighting Schemes for Latent Dirichlet Allocation", Human Language Technologies: The 2010 Annual Conference of the North American Chapter of the ACL, pp. 465-473.
Zheng et al., "A Framework for Authorship Identification of Online Messages: Writing-Style Features and Classification Techniques", Journal of the American Society for Information Science and Technology, 2006, vol. 57, No. 3, pp. 378-393.

\* cited by examiner

SYSTEMS AND METHODS FOR IDENTIFYING TERMS RELEVANT TO WEB PAGES USING SOCIAL NETWORK MESSAGES

RELATED APPLICATION

This application claims priority to provisional application No. 61/285,944 filed Dec. 11, 2009, the disclosure of which is incorporated herein by reference.

BACKGROUND

The invention generally relates to messaging in social networks, and more particularly relates to matching messages to web pages.

Due to the tremendous amount of information available on the Internet, finding the most appropriate information or content that a searcher is looking for can be quite difficult. Likewise, locating and/or associating or linking messages from a social network with relevant content, e.g., web pages, can prove even more difficult given the inherent limited nature of the messages in both content and actual characters in the messages.

SUMMARY OF THE INVENTION

Systems and methods for retrieving social network messages and/or web pages in response to search queries in accordance with embodiments of the invention are described. One embodiment of the invention includes generating a word list from at least a portion of the content of the web page using a web and message server system, generating an initial list of relevant terms based upon the word list using the web and message server system, identifying additional relevant terms using messages posted to at least one social network based upon the initial list of relevant terms, and creating an updated list of relevant terms by using the web and server system to combine terms in the initial list of relevant terms with the additional relevant terms identified using messages posted to at least one social network.

In a further embodiment of the invention generating a word list from at least a portion of the content of the web page using a web and message server system includes extracting desired content from the web page, and generating a list of words utilized in the extracted web page content.

In another embodiment of the invention the desired content extracted from the web page includes content from the group made up of the title, URL, links, and body of the web page.

In a still further embodiment of the invention, extracting desired content from the web page includes performing document object model analysis on the web page.

In still another embodiment of the invention, generating a list of words utilized in the extracted web page content includes generating a list of words that appear in the extracted web page content, filtering the list of words to eliminate words identified in a predetermined list of stop words, and filtering the list of words to remove case and tense variants of words.

In a yet further embodiment of the invention, generating an initial list of relevant terms based upon the word list using the web and message server system includes generating combinations of words that appear as neighboring words in the extracted web page content, and combining the word combinations with the list of individual words to generate the initial list of relevant terms.

In yet another embodiment of the invention, each of the generated combinations is limited to a predetermined number of words.

A further embodiment of the invention again also includes scoring each term in the initial list of terms with respect to at least the extracted content from the web page.

In another embodiment of the invention again, scoring each of the terms with respect to at least the extracted content from the web page includes scoring each term based upon at least one characteristic including a characteristic from the group made up of the number of occurrences of the term in the extracted web page content, the number of occurrences of the term in the original web page, the uniqueness of the term, the position of the term on the web page, and combinations thereof.

In a further additional embodiment, uniqueness of a term is determined based upon the message rate of the term within at least one message stream.

In another additional embodiment, the uniqueness of a term increases below a predetermined threshold, and the uniqueness of a term decreases above the predetermined threshold.

In a still yet further embodiment, identifying additional relevant terms using messages posted to at least one social network based upon the initial list of relevant terms includes determining the uniqueness of all combinations of a predetermined selection of the highest scoring terms from the initial list of relevant terms, and selecting combinations of the terms based upon the uniqueness of the combination.

In still yet another embodiment, uniqueness of a combination of terms is determined based upon the message rate of the combination of terms within at least one message stream.

In a still further embodiment again, the uniqueness of the combination of terms increases below a predetermined threshold, and the uniqueness of the combination of terms decreases above the predetermined threshold.

In still another embodiment again, the predetermined selection of the highest scoring terms from the initial list of relevant terms is a predetermined number of the terms from the initial list with the highest scores.

In a still further additional embodiment, the predetermined selection of the highest scoring terms from the initial list of relevant terms includes all terms from the initial list with scores exceeding a predetermined threshold.

In still another additional embodiment, creating an updated list of relevant terms by using the web and server system to combine terms in the initial list of relevant terms with the additional relevant terms identified using messages posted to at least one social network scoring each combination of terms with respect to at least the extracted content from the web page, and adding the combinations of terms to the initial list of terms.

A yet further embodiment again also includes sorting the combinations of terms and the terms in the initial list of terms based upon score, and selecting an updated list based upon a predetermined selection of the highest scoring terms from the sorted list.

In yet another embodiment again, scoring each combination of terms with respect to at least the extracted content from the web page includes scoring each combination of terms based upon at least one characteristic including a characteristic from the group made up of the number of occurrences of the term in the extracted web page content, the number of occurrences of the term in the original web page, the uniqueness of the term, the position of the term on the web page, and combinations thereof.

In a yet further additional embodiment, identifying additional relevant terms using messages posted to at least one social network based upon the initial list of relevant terms includes retrieving messages by querying at least one social network using terms from the initial list of terms, and generating an additional list of relevant terms based upon the retrieved messages.

In yet another additional embodiment, generating an additional list of relevant terms based upon the retrieved messages includes generating a list of words that appear in the retrieved messages, filtering the list of words to eliminate words identified in a predetermined list of stop words, filtering the list of words to remove case and tense variants of words, generating combinations of words that appear as neighboring words in the retrieved messages, and combining the word combinations with the filtered list of individual words to generate the additional list of relevant terms.

In another further embodiment, creating an updated list of relevant terms by using the web and server system to combine terms in the initial list of relevant terms with the additional relevant terms identified using messages posted to at least one social network includes scoring the terms in the additional list of relevant terms based upon messages retrieved from a social network, and adding the scored terms to the initial list of relevant terms.

In still another further embodiment, retrieving messages by querying at least one social network using terms from the initial list of terms further includes determining the topic of the web page, and scoring the terms in the additional list of relevant terms using a set of messages having relevancy to the topic of the webpage.

In yet another further embodiment, scoring the terms in the additional list of relevant terms using messages having relevancy to the topic of the webpage includes scoring each term in the additional list of relevant terms based upon at least one characteristic including a characteristic from the group made up of the number of occurrences of the term in the set of messages having relevancy to the topic of the web page, the uniqueness of the term, the position of the term in each message, and combinations thereof.

In another further embodiment again, adding the scored terms to the initial list of relevant terms further includes adding a predetermined selection of the highest scoring terms from the additional list of relevant terms.

DESCRIPTION

Turning now to the drawings, systems and methods for retrieving social network messages and/or web pages in response to search queries in accordance with embodiments of the invention are illustrated. In several embodiments, search results are improved by matching social network messages to web pages in order to obtain additional information concerning the relevancy of search terms to specific web pages. Social network messages are typically short messages that can incorporate unique terminology adapted to the constraints of the messaging medium. In several embodiments, an initial list of relevant terms is generated based upon a specific web page. The initial list of relevant terms is then used to generate an expanded list of relevant terms based upon terms used in social network messages using techniques including but not limited to static phrase expansion and/or dynamic phrase expansion.

The term static phrase expansion can be used to refer to processes for assigning relevancy scores to phrases constructed using keywords extracted from a web page by analyzing the message rates of messages in a social network that contain the constructed phrases. The message rates provide information concerning the relevancy and uniqueness of the constructed phrase. The message rates can be used to sort or rank the constructed phrases and optionally the bottom or low/lowest scored phrases can be removed or ignored. In addition, phrases that appear with a frequency above a predetermined rate can also be ignored on the basis that the terms are common and not indicative of relevance with the web page.

The term dynamic phrase expansion can be used to refer to processes for generating an expanded list of relevant search terms by querying one or more social networks using an initial list of search terms, and identifying additional relevant terms used in the social network messages returned by the social network. It should be appreciated that the terms obtained by dynamically analyzing messages retrieved from the one or more social networks will likely include different or "new" terms (i.e. terms not found/used in the web page) since social network message limits are typically finite, often summarize thoughts and/or reflect a deliberate or thoughtful choice of words.

In many embodiments, the information parsed from each web page can include but is not limited the title, universal resource locator (URL), description tag, keywords tag, and/or main body of the page. Keywords are extracted from the parsed information. In several embodiments, the keywords are extracted using keyword extraction techniques based on term frequency. Although any of a variety of keyword extraction techniques can be utilized in accordance with embodiments of the invention. Scores are assigned to and used to rank the extracted keywords by looking for the existence of the particular keyword in the title, URL, links, and body of the page. In several embodiments, the initial list of relevant terms is not limited to keywords, and includes phrases. The initial list of relevant terms or a portion of the initial list can then be used as a search criteria in a social network, and messages can be gathered that match the search criteria and used to perform static and/or dynamic phrase expansion to create an expanded list of relevant search terms. The expanded list of relevant search terms can then be used in the retrieval of web pages and/or social network messages in response to search queries. The generation of lists of terms relevant to specific web pages, expanding the lists of relevant terms based upon social network messages using processes including but not limited to static phrase expansion and/or dynamic phrase expansion, and the retrieval of web pages and/or social network messages in response to search queries using expanded lists of relevant search terms are discussed further below.

System Architecture

Figure 1:
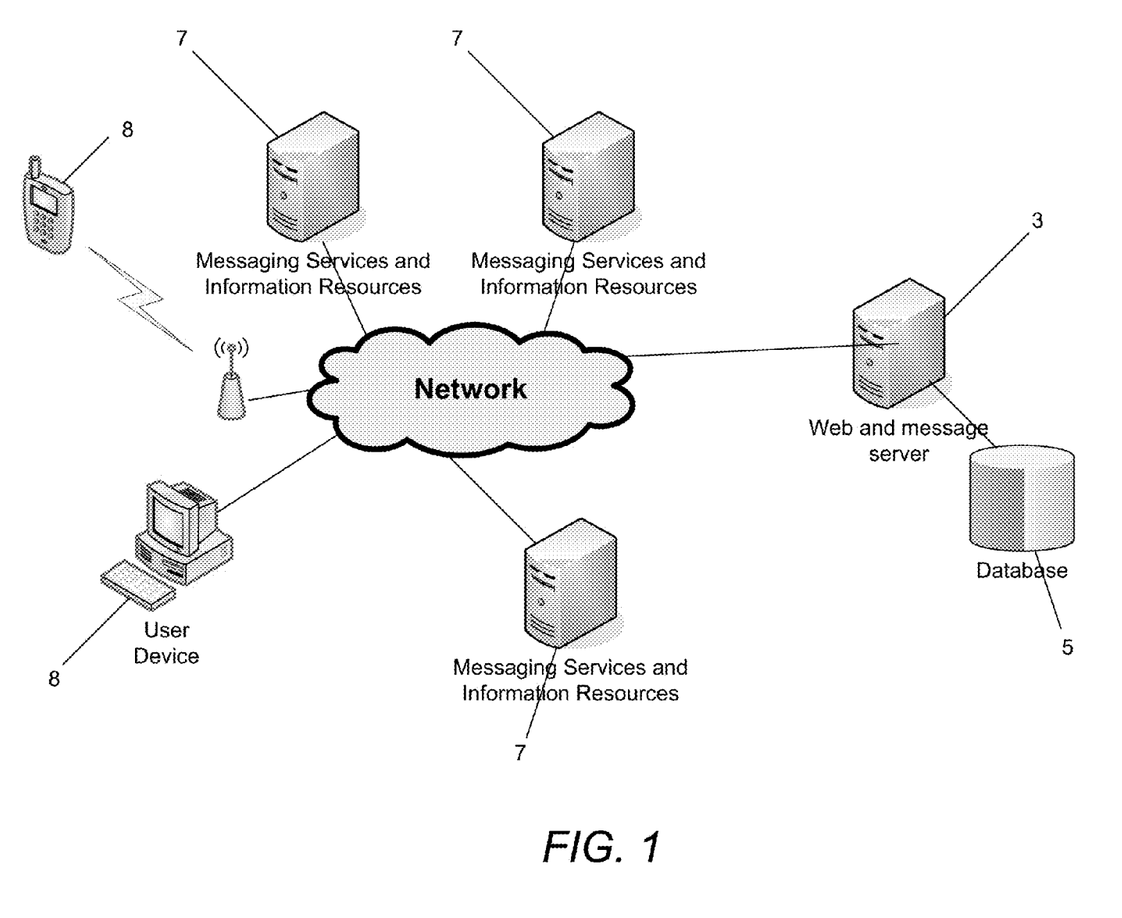
FIG. 1 is a block diagram illustrating a web page and messaging search and retrieval system in accordance with an embodiment of the invention.

In FIG. 1, a web page and message search and retrieval system is shown. The system includes a web and message server 3 that is coupled with a web page and message database 5 and is in network communication with a plurality of messaging and web services and information sources 7. The web and message server and the web and message database can collectively be considered a web and message server system. In many embodiments, a web and message server system can include more than one server and more than one database. In addition, the web and message server system can include additional servers performing functions including but not limited to serving web pages enabling users to interact with the web and message server system via web based user interfaces. Web and message servers and web and message databases in accordance with embodiments of the invention are discussed further below.

In the illustrated embodiment, the web and message server receives web pages from remote servers and generates a record for each received web page in the web and message database. In several embodiments, at least a portion of the received web page is associated with the page's record within the web and message database. The web and message server extracts a list of terms from at least a portion of the web page and the list of terms is associated with the page's record. In many embodiments, each term is scored based upon its relevancy to the web page and the scores are also associated with the keywords in the page's record.

In many embodiments, the web and message server is also configured to receive user generated messages from a plurality of messaging services and information sources including but not limited to the Facebook service provided by Facebook, Inc., the Twitter service provided by Twitter, Inc., and/or the LinkedIn service provided by LinkedIn, Inc. In many embodiments, the received messages are also stored and/or associated with records in the web and message database. In a number of embodiments, keywords are selected from the received messages and utilized in the identification of additional terms relevant to web pages for which records exist in the database.

As noted above, the web and message server 3 can also receives search queries from user devices 8 either indirectly via, for example, messaging services or web servers 7 or directly, for example, through a user interface in communication with the web and message server. Examples of user devices include but are not limited to personal computers, mobile phones, and other types of web connected consumer electronics devices such as tablets, cable boxes, DVD players, and televisions. For each received search query, the web and message server identifies records within the message and web database that are relevant to the search query. The identified records can relate to social network messages and/or web pages and information from the identified records can be retrieved from the database 5 by the server 3 and transmitted back to a designated recipient, e.g., the sender of the search query. In many embodiments, the information can include but is not limited to relevant social network messages and/or URLs of relevant web pages. In several embodiments, information extracted from the web page indicated by the URL is also provided in conjunction with each URL to assist a user in evaluating the web page or message that is actually of most interest to them. Processes for identifying search terms relevant to web pages and or social network messages and for retrieving web pages and/or social network messages in response to a search query in accordance with various embodiments of the invention are discussed further below.

Identifying Relevant Search Terms

Figure 2:
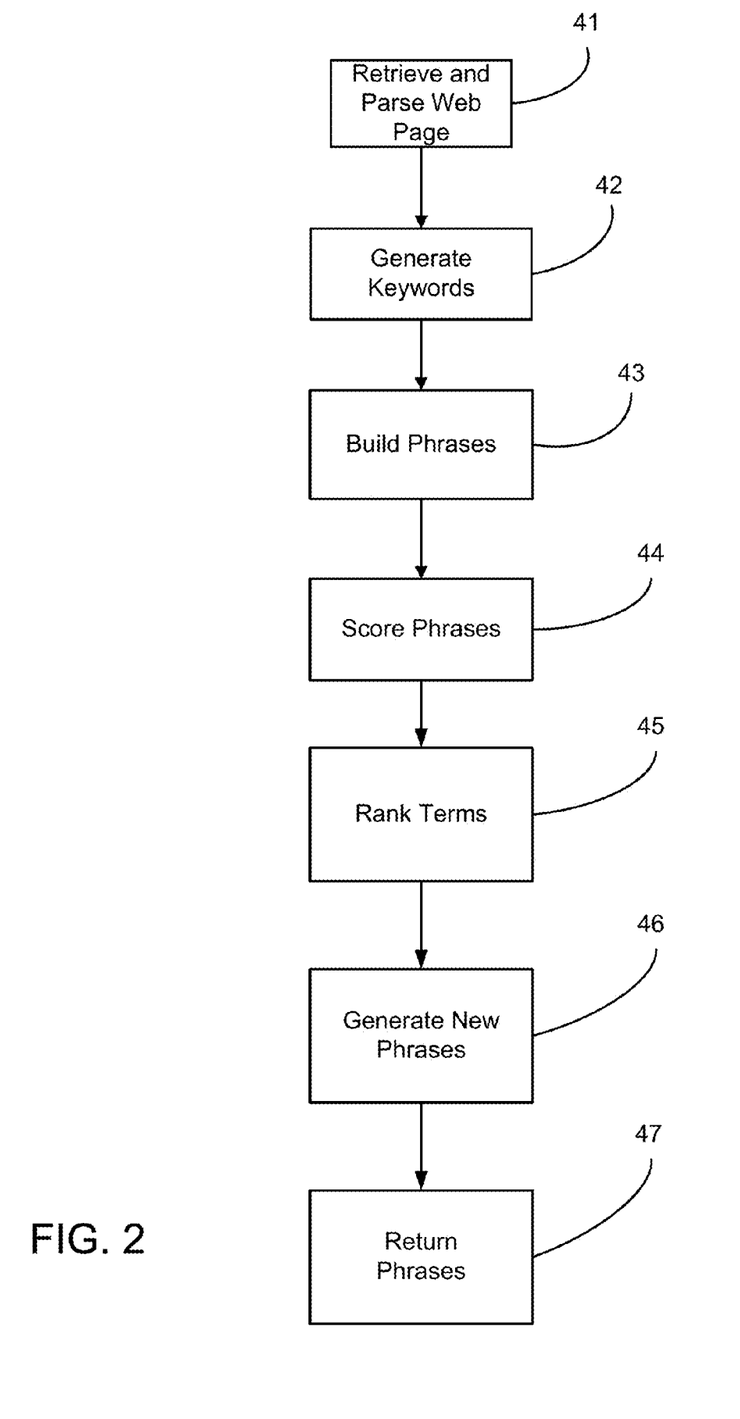
FIG. 2 is a flowchart illustrating a web page and messaging search and retrieval process in accordance with an embodiment of the invention.

Referring now to FIG. 2, a process for identifying search terms relevant to a web page in accordance with an embodiment of the invention is shown. When identifying relevant search terms, a given candidate web page is identified and retrieved (41). In many embodiments, undesired content from the web page is then removed or otherwise ignored. The undesired content can include but is not limited to navigational content, advertisements, interactive material, and other content that is not particularly relevant to the intent of the page when viewed by a user. In many embodiments, the title, URL, links, and body of the web page are desired content that is extracted from the web page for use. One technique for performing such a removal is document object model (DOM) analysis. Although other techniques suitable for removal of information can be utilized in accordance with the requirements of a specific application.

From the reduced web page or the extracted content from the web page, a list of words from the page is created (42). In generating the word list, "stop" words (e.g., common words in a language, such as prepositions) are removed and in one embodiment all case and tense variants of a word are also removed. For example "skateboard" "skateboarding" "skateboarder" all become three cases of one word, "skateboard". From the word list, words are combined or stringed together to build phrases (43). In several embodiments, phrases are built using words from the word list by grouping all combinations of up to a particular number, "N", of neighboring words into a phrase.

The generated phrases are then applied to the reduced web page and/or in many embodiments the original web page resulting in a score for each of the phrases (44). In several embodiments, each of the phrases are scored based upon the number of occurrences in the document, uniqueness, the position on the page, if the terms exist in links or the page's title or URL, and other identified criteria. The phrases or the words in each of the phrases are then ranked utilizing the scores for each of the phrases in which the word appears (45). Term uniqueness is described in greater detail below. Once an initial list of terms has been generated, the initial list of terms can be expanded by utilizing the initial list to identify additional relevant terms in social network messages and/or one or message streams. Various techniques for expanding an initial list of relevant terms including static phrase expansion, and dynamic phrase expansion in accordance with embodiments of the invention are discussed below.

Static Phrase Expansion

In several embodiments, additional or new phrases are generated using static phrase expansion, dynamic phrase expansion or a combination thereof (46). Static phrase expansion is done by calculating the uniqueness of all combinations of the top scoring N phrases, and removing combinations that score above a specified uniqueness threshold. For example, in one embodiment, a uniqueness score that is too high means that the combination would produce too few messages, if any. For example, if the top two terms from the previous described ranking are "skateboard" and "safety", a new term "skateboard safety" is generated and calculated for uniqueness. Estimation of term uniqueness is described in greater detail below. A score is then generated for these expanded phrases or phrases with the new expanded terms. In many embodiments, the new phrases are then applied to the reduced web page and/or in several embodiments the original web page resulting in a score for each of the phrases. In a number of embodiments, each of the phrases are scored based upon the number of occurrences in the document, uniqueness, the position on the page, if the terms exist in links or the page's title or URL, and other identified criteria. In several embodiments, by utilizing the original phrase scores and the uniqueness of the expanded phrase, the scores for the expanded phrases are generated. The entire list of phrases is sorted by their score and only a specific number of phrases are kept, e.g., the top M phrases. Where appropriate, case or tense variants are removed, and additional new phrases are supplied that include these tense or case variants.

Dynamic Phrase Expansion

In several embodiments, in order to also provide content that may be "hot" or especially relevant at a specific moment, dynamic phrase expansion can be conducted. In many embodiments, the N highest scoring terms for a web page can be used as search queries in a social network and the search results analyzed to generate a list of new terms using techniques similar to those outlined above with respect to the construction of an initial list of relevant terms from a web page. In a number of embodiments, the new terms are then scored using a set of messages including but not limited to a stream of messages, and/or a predetermined set of messages satisfying specific criteria. Examples of appropriate criteria include but are not limited to messages sent during a set period of time, or messages having a particular topic relevancy. In several embodiments, each of the terms are scored based upon the number of occurrences in the message, uniqueness, the position in the message, if the terms exist in links or other associated content, and/or in accordance with other criteria appropriate to a specific application. These new phrases may optionally be added to the list of relevant terms for the document, or concatenated with the original set of relevant terms. In several embodiments, only terms exceeding a predetermined threshold score and/or a predetermined number of the highest scoring terms are added to the initial list of relevant terms.

In one embodiment, a search for the top M scoring phrases is conducted via candidate social networks. This search results in some number of social messages that contain the search phrases. Although the messages may contain the candidate phrase, they may not be appropriate for the given web page. For example, a phrase that is semantically ambiguous may provide messages not appropriate for the page. Or the message may be simply "off-topic", where the message may contain the desired phrase but little other information relevant to the page. To remove these messages, the topic of the given web page can be determined, and the topic used to filter messages that are not related to this topic. Techniques for determining the topic of a web page and the topic relevancy of a message are discussed further below.

Additional constraints can also be applied to the message results when attempting to identify additional terms relevant to a specific web page. For example, additional criteria could be applied to remove or retain messages matching the criteria, e.g., messages that link to multimedia content, or messages from a certain user.

Determined Phrases

Referring back to FIG. 2, once relevant terms, whether phrases or keywords, are determined for a given web page or pages, the phrases or keywords are associated with the web page or pages (47). In one embodiment, the phrases and/or keywords are stored as metadata with the web page, the portions extracted from the web page and/or are associated with the web page's URL. The terms can then be used to assist in the identification of web pages relevant to a specific search query. In many embodiments, the scored terms are the sole basis for the determination of relevancy. In other embodiments, the scored terms can be utilized in conjunction with other characteristics of the web page to score the relevance of the web page to a specific search query.

Estimation of Term Uniqueness

As noted above, term uniqueness can be a factor utilized in scoring the relevancy of terms to a particular piece of content such as a web page, content extracted from a web page, or a message on a social network. A message stream is a time ordered set of messages in which the messages are short and/or limited to a specific number of words or characters, e.g., 140 characters. In one embodiment, given a search term, the average number of messages containing the search term (keyword) during a fixed period of time is found. The average number of messages versus the fixed time period is the message rate. The lower the message rate the more unique the search term. Utilizing a message rate, unique search terms can be determined for a given category or topic specifically pertaining to the given category or topic. In several embodiments, the optimal number of messages for a fixed period of time can be determined to further refine or enhance the search results. For example, zero search results would indicate that the phrase may not really exist, and too high a search frequency would indicate that the phrase is too common.

Figure 3:
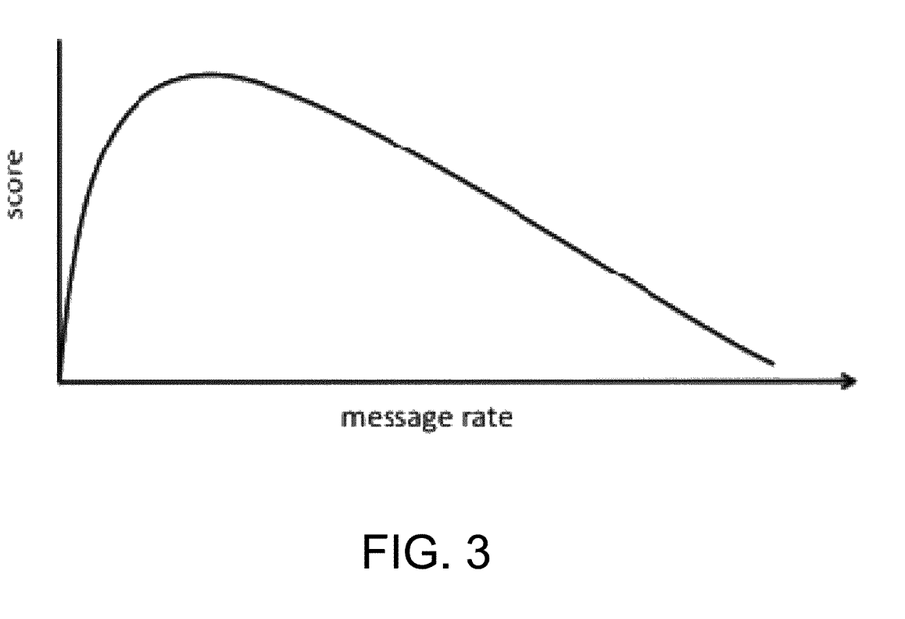
FIG. 3 is a graphical representation of a score versus message rate in accordance with an embodiment of the invention.

A score can be determined via a function similar to the function depicted in the chart shown in FIG. 3. According to this function, a zero message rate would receive a zero score, and high messages would also receive a low score. However, very low message rates would also receive a poor score. Although a specific function is illustrated in FIG. 3, any of a variety of functions appropriate to specific applications can be utilized in accordance with embodiments of the invention including functions in which uniqueness score increases with message score up to a threshold message rate, and uniqueness score decreases with message score above the threshold message rate.

Web Page Topic Mapping

When using social network messages to identify terms relevant to a web page, the ability to determine the topic of a web page can be useful in identifying a set of social network messages relevant to the topic of the web page. In several embodiments, the topic of a web page can be determined by comparing the web page being analyzed to a listing of web pages broken down by topic or categories. These categories form a multi-level hierarchy, or tree structure. For example, a first-level category may be "Sports". Within this category, there may be additional categories "Basketball", "Baseball", and "Football". Within "Basketball", there may be the categories "College" and "Professional". Thus, "Sports→Basketball→College" is a three level deep category. These listing may also include web page titles, descriptions or excerpts, and the category they belong to. Since there may be thousands of nested categories, it may be useful to coalesce these categories into a simplified tree that is only N levels in depth. For example, if a tree with a maximum depth of two levels is desired, then all pages about the topic "Basketball" would be in "Sports→Basketball", regardless if they are from the "College" or "Professional" categories.

In several embodiments, the comparison between the web page being analyzed and the web page topics can be performed by calculating the TF-IDF (term frequency-inverse document frequency) values for every term in at least a portion of the every web page in each N level deep category. An inverted index of all these terms can also be generated that maps a term to a topic (an N level deep category) for fast retrieval of the information. The topic relevancy of the web page can then be performed by comparing the cosine similarity of all the text in the candidate web page with every indexed topic. The indexed topic that provides the highest cosine similarity score can be chosen as the topic of the candidate web page. Although a process for determining website topic relevancy using TF-IDF calculations and cosine similarity comparisons is disclosed above, any of a variety of processes for determining web page relevancy appropriate to a specific application can be utilized in accordance with embodiments of the invention.

Topic Relevance of Social Network Messages

Once the topic of the web page has been determined, the topic can be used to identify social network messages that are relevant to the same or an equivalent topic. In a number of embodiments, the relevance of a social network message to a specific topic can be scored by comparing keywords in the message against a list of keywords relevant to the specific topic. A process for generating lists of keywords relevant to specific topics and scoring the relevancy of individual messages to a specific topic are discussed further below.

Categories and Keywords

Categories of interest or topics can be generated by identifying a specific subject, such as a person, place or an object. In many embodiments, categories are refined based on usage performance. In particular, categories focused on things perform well with narrower descriptions having better performance. For example, a category such as "sports" would not perform as well as "basketball", which would not perform as well as "UCLA basketball". These fine grained categories however can come at the cost of increased processing time and storage. In several embodiments, each category is unique having no overlap with other categories.

For each category generated, one or more keywords are identified and associated with each category. The keywords associated with each category come from messages in the desired medium (e.g., messaging service). As such, in one embodiment, within each category, there is a specific table with one or more specific keywords for each medium. Each medium can have different message formats and/or terminology used. For example, text messages from a mobile phone can and will often look quite different from messages posted to Facebook. Thus, keywords from other sources in one embodiment are only used as a search query/filter with respect to the desired message format. In this way the keyword tables would account for slang terms and other such differentiators specific to the medium. One or more of the following processes can be used to identify the keywords that are associated with a specific category. Although specific examples are provided below, any of a variety of techniques can be utilized to build lists of keywords relevant to specific topics as appropriate to specific applications.

Unambiguous Training

For a given category, e.g., musical artists, there can be ambiguous and unambiguous terminology. For example, an artist name can be ambiguous ("the Beatles") or unambiguous ("Paul McCartney"). Utilizing unambiguous terminology, every keyword used in a message containing "Paul McCartney" would be stored, and the usage frequencies of the keywords would be used as a measure of how related to the musical artist category a given query would be.

User Tagging

A message database in one embodiment would allow for manual tagging of information. These tags are created by users as a means to self-classify messages. One example is preceding a tag name with a unique character, e.g., a "#" character. For example, if a message contains "#oscars", then presumably the message is about the Academy Award Ceremony, commonly referred to as "the Oscars". As such, keywords about the Oscars awards ceremony can be generated by finding every message with the "#oscars" tag, and store each of the keywords present in the located messages. The resulting table would thus include words commonly used to describe the ceremony, and thus using the table a message that did not have a "#oscars" tag could still be located.

Third-Party Information

In one embodiment, a third party database or similar resource can be used to identify keywords. For example, utilizing a resource, such as Wikipedia, as a large collection of words related to a category, a TF-IDF analysis of this resource would yield the most important keywords for a given category. Messages could be searched to locate messages that used these keywords in which each of the resulting message-based keywords are stored in the associated category's table.

Category and Message Scoring

Once lists of keywords relevant to different topics have been constructed, the relevance of a specific message to a topic can be determined using a relevance score defined by $$\text{score}(m, c) = \sum_{g \in m} f(P(g, c))$$

where m is a given message, c is a given category, g is a keyword in the message, and P(g,c) is the normalized frequency of a message in category c containing the keyword g. The function $f$ is a thresholding or quantization function.

Quantization Function $f$

Most category tables have probability distributions that follow a power-law distribution. However, the resulting tables may have a large number of small values, or conversely, a small number of large values. In such cases it may be helpful to pass this table through a quantization function. The simplest function is simply a threshold, by which any keywords that do not pass the threshold have frequencies set to 0. More complex quantizers are used to simplify the table, boost certain values, or otherwise be shaped to improve the scoring performance.

A final relevancy score can be defined as $w_{score} \cdot \text{score}(m, c_q) + w_{match} \cdot \text{match}(m,q)$, where w is a weight [0 . . . 1], score $(m, c_q)$ is the score of the message in the query's category, and match(m,q) is the percentage of keywords that match between message m and the query q. This value is used to ensure that the messages have some similarity, even if they both score high in each category.

Referring now to an example, if the query is "Amazon river", then this query would rank high in a category about rivers, the Amazon jungle, or even geographical categories. This query however would score lower in categories about companies, as the term "river" would not occur very frequently in these categories. Similarly, the message "Hiked to the Amazon today—what a beautiful jungle this is" would also rank high in the category of geographical messages, as the keywords "hiked" and "jungle" would appear often in such categories. Finally, the message matches 50% of the terms in the query (i.e., "Amazon"), ensuring that the message has a relation to the query and not just the category as a whole.

Filtering Messages by Topic

Figure 4:
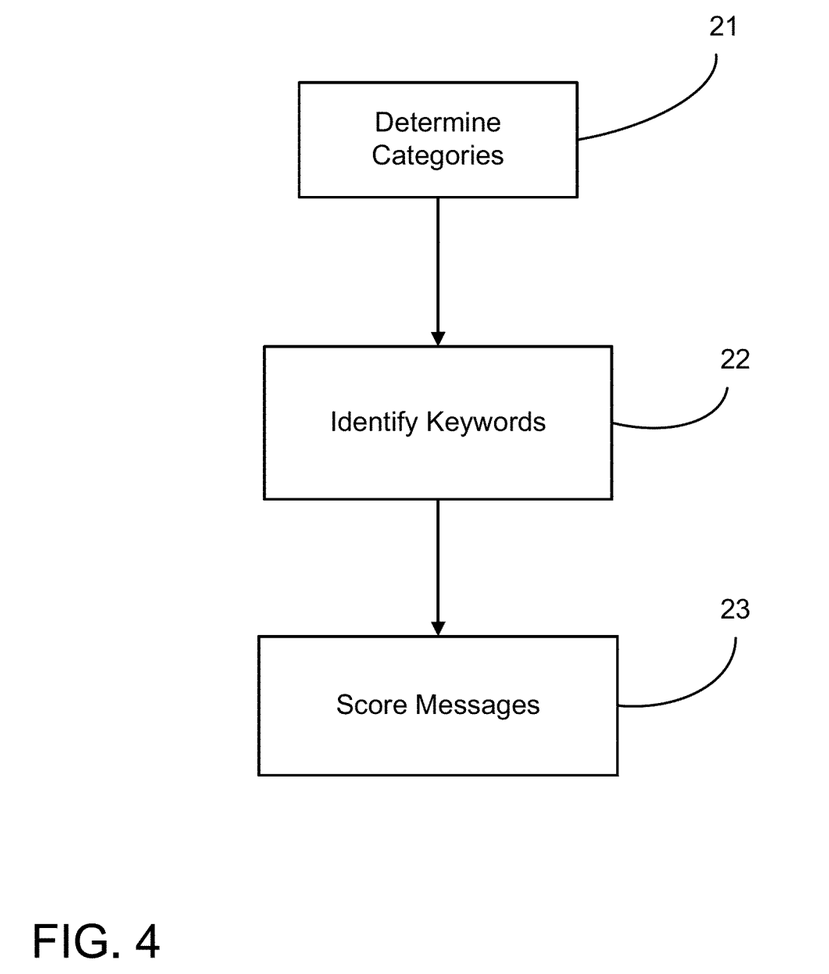
FIG. 4 is a flowchart illustrating a process for filtering messages based upon topic relevancy in accordance with an embodiment of the invention.

In FIG. 4, a process for filtering messages by topic in accordance with an embodiment of the invention is illustrated. Initially, categories are determined (21). Keywords are identified and used to populate tables for each determined category (22). In one embodiment, a medium is identified and used to select tables in which to populate with the keywords identified. When queries are performed using terms relevant to a web page, the messages received in response to the search query can be scored for relevancy to the topic of the web page (23). In this way, relevancy of the messages is confirmed prior to the use of the messages for purposes including but not limited to scoring the relevancy of the query term to the web page. Although a specific process is illustrated in FIG. 4, any of a variety of processes can be utilized to identify social network messages that are relevant to the topic of a specific web page in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed:

1. A method of identifying a list of terms relevant to a web page, comprising:
   generating a word list from at least a portion of the content of a web page using a web and message server system;
   generating an initial list of relevant terms based upon the word list using the web and message server system;
   selecting at least one category from a predetermined plurality of categories to which the web page is relevant based on the initial list of relevant terms using the web and message server system by:
      calculating a plurality of relevancy scores for the web page with respect to the predetermined plurality of categories using the web and message server system, where:
         each of the plurality of relevancy scores is a score determined with respect to one of the plurality of categories, and a given relevancy score is determined using a predetermined plurality of keywords related to one of the plurality of predetermined categories;
         a predetermined plurality of keywords is related to each of the plurality of predetermined categories;
         a normalized keyword frequency is assigned to each of the predetermined plurality of keywords related to each of the plurality of predetermined categories, where the normalized keyword frequency is determined for a given predetermined keyword from the predetermined plurality of keywords based upon the frequency with which the given predetermined keyword appears within a predetermined training data set comprising a plurality of messages that are relevant to the category from the plurality of predetermined categories to which the given predetermined keyword is related; and
         calculating a given relevancy score for the web page with respect to a given category from the plurality of predetermined categories comprises using the normalized frequencies of the predetermined plurality of keywords related to the given category to determine a likelihood that each term in the initial list of relevant terms is present in a message relevant to the given category;
      storing the plurality of relevancy scores for the web page with respect to the predetermined plurality of categories using the web and message server system; and
      identifying at least one category relevant to the web page based on the plurality of stored relevancy scores using the web and message server system;
   identifying additional relevant terms based on the predetermined plurality of keywords related to the at least one category selected as relevant to the web page using the web and message server system; and
   creating an updated list of relevant terms by combining terms in the initial list of relevant terms with additional relevant terms identified based on the predetermined plurality of keywords related to the at least one category selected as relevant to the web page using the web and message server system.

2. The method of claim 1, wherein generating a word list from at least a portion of the content of the web page using a web and message server system comprises:
   extracting desired content from the web page; and
   generating a list of words utilized in the extracted web page content.

3. The method of claim 2, wherein the desired content extracted from the web page includes content from the group consisting of the title, URL, links, and body of the web page.

4. The method of claim 2, wherein extracting desired content from the web page comprises performing document object model analysis on the web page.

5. The method of claim 2, wherein generating a list of words utilized in the extracted web page content comprises:
   generating a list of words that appear in the extracted web page content;
   filtering the list of words to eliminate words identified in a predetermined list of stop words; and
   filtering the list of words to remove case and tense variants of words.

6. The method of claim 1, wherein generating an initial list of relevant terms based upon the word list using the web and message server system comprises:
   generating combinations of words that appear as neighboring words in the extracted web page content; and
   combining the word combinations with the list of individual words to generate the initial list of relevant terms.

7. The method of claim 6, wherein each of the generated combinations is limited to a predetermined number of words.

8. The method of claim 6, further comprising scoring each term in the initial list of terms with respect to at least the extracted content from the web page.

9. The method of claim 8, wherein scoring each of the terms with respect to at least the extracted content from the web page comprises:
   scoring each term based upon at least one characteristic including a characteristic from the group consisting of:
      the number of occurrences of the term in the extracted web page content;
      the number of occurrences of the term in the original web page;
      the uniqueness of the term;
      the position of the term on the web page; and
      combinations thereof.

10. The method of claim 9, wherein uniqueness of a term is determined based upon the message rate of the term within at least one message stream.

11. The method of claim 10, wherein:
    the uniqueness of a term increases below a predetermined threshold; and
    the uniqueness of a term decreases above the predetermined threshold.

12. The method of claim 1, wherein identifying additional relevant terms using messages posted to at least one social network based upon the initial list of relevant terms comprises:
    determining the uniqueness of all combinations of a predetermined selection of the highest scoring terms from the initial list of relevant terms; and
    selecting combinations of the terms based upon the uniqueness of the combination.

13. The method of claim 12, wherein uniqueness of a combination of terms is determined based upon the message rate of the combination of terms within at least one message stream.

14. The method of claim 13, wherein:
the uniqueness of the combination of terms increases below a predetermined threshold; and
the uniqueness of the combination of terms decreases above the predetermined threshold.

15. The method of claim 12, wherein the predetermined selection of the highest scoring terms from the initial list of relevant terms is a predetermined number of the terms from the initial list with the highest scores.

16. The method of claim 12, wherein the predetermined selection of the highest scoring terms from the initial list of relevant terms includes all terms from the initial list with scores exceeding a predetermined threshold.

17. The method of claim 12, wherein creating an updated list of relevant terms by using the web and server system to combine terms in the initial list of relevant terms with the additional relevant terms identified using messages posted to at least one social network comprises:
scoring each combination of terms with respect to at least the extracted content from the web page; and
adding the combinations of terms to the initial list of terms.

18. The method of claim 17, further comprising:
sorting the combinations of terms and the terms in the initial list of terms based upon score; and
selecting an updated list based upon a predetermined selection of the highest scoring terms from the sorted list.

19. The method of claim 17, wherein scoring each combination of terms with respect to at least the extracted content from the web page comprises:
scoring each combination of terms based upon at least one characteristic including a characteristic from the group consisting of:
the number of occurrences of the term in the extracted web page content;
the number of occurrences of the term in the original web page;
the uniqueness of the term;
the position of the term on the web page; and
combinations thereof.

20. The method of claim 1, wherein identifying additional relevant terms using messages posted to at least one social network based upon the initial list of relevant terms comprises:
retrieving messages by querying at least one social network using terms from the initial list of terms; and
generating an additional list of relevant terms based upon the retrieved messages.

21. The method of claim 20, wherein generating an additional list of relevant terms based upon the retrieved messages comprises:
generating a list of words that appear in the retrieved messages;
filtering the list of words to eliminate words identified in a predetermined list of stop words;
filtering the list of words to remove case and tense variants of words;
generating combinations of words that appear as neighboring words in the retrieved messages; and
combining the word combinations with the filtered list of individual words to generate the additional list of relevant terms.

22. The method of claim 20, wherein creating an updated list of relevant terms by using the web and server system to combine terms in the initial list of relevant terms with the additional relevant terms identified using messages posted to at least one social network comprises:
scoring the terms in the additional list of relevant terms based upon messages retrieved from a social network;
adding the scored terms to the initial list of relevant terms.

23. The method of claim 22, wherein retrieving messages by querying at least one social network using terms from the initial list of terms further comprises:
determining the topic of the web page; and
scoring the terms in the additional list of relevant terms using a set of messages having relevancy to the topic of the webpage.

24. The method of claim 23, wherein scoring the terms in the additional list of relevant terms using messages having relevancy to the topic of the webpage comprises:
scoring each term in the additional list of relevant terms based upon at least one characteristic including a characteristic from the group consisting of:
the number of occurrences of the term in the set of messages having relevancy to the topic of the web page;
the uniqueness of the term;
the position of the term in each message; and
combinations thereof.

25. The method of claim 23, wherein adding the scored terms to the initial list of relevant terms further comprises adding a predetermined selection of the highest scoring terms from the additional list of relevant terms.

26. A web and message server system, comprising:
memory configured to store a term relevance application; and
a processor;
wherein the term relevance application configures the processor to:
generate a word list from at least a portion of the content of a web page;
generate an initial list of relevant terms based upon the word list;
select at least one category from a predetermined plurality of categories to which the web page is relevant based on the initial list of relevant terms by:
calculating a plurality of relevancy scores for the web page with respect to the predetermined plurality of categories, where:
each of the plurality of relevancy scores is a score determined with respect to one of the plurality of categories, and a given relevancy score is determined using a predetermined plurality of keywords related to one of the plurality of predetermined categories;
a predetermined plurality of keywords is related to each of the plurality of predetermined categories;
a normalized keyword frequency is assigned to each of the predetermined plurality of keywords related to each of the plurality of predetermined categories, where the normalized keyword frequency is determined for a given predetermined keyword from the predetermined plurality of keywords based upon the frequency with which the given predetermined keyword appears within a predetermined training data set comprising a plurality of messages that are relevant to the category from the plurality of predetermined categories to which the given predetermined keyword is related; and calculating a given relevancy score for the web page with respect to a given category from the plurality of predetermined categories comprises using the normalized frequencies of the predetermined plurality of keywords related to the given category to determine a likelihood that each term in the initial list of relevant terms is present in a message relevant to the given category;

storing the plurality of relevancy scores for the web page with respect to the predetermined plurality of categories; and identifying at least one category relevant to the web page based on the plurality of stored relevancy scores;

identify additional relevant terms based on the predetermined plurality of keywords related to the at least one category selected as relevant to the web page; and create an updated list of relevant terms by combining terms in the initial list of relevant terms with additional relevant terms identified based on the predetermined plurality of keywords related to the at least one category selected as relevant to the web page.

\* \* \* \* \*